June 20, 1961   D. BERG   2,989,577
ELECTRICAL APPARATUS EMBODYING GASEOUS INSULATION
Filed April 24, 1958   2 Sheets-Sheet 1

June 20, 1961   D. BERG   2,989,577
ELECTRICAL APPARATUS EMBODYING GASEOUS INSULATION
Filed April 24, 1958   2 Sheets-Sheet 2

Positive DC Breakdown $\frac{1}{16}"$ Hemispherical Point To Plane For Various Mixtures Of $SF_6$-$CF_3$ $SF_5$ As A Function Of Gap

United States Patent Office

2,989,577
Patented June 20, 1961

---

2,989,577
ELECTRICAL APPARATUS EMBODYING GASEOUS INSULATION
Daniel Berg, Churchill, Pa., assignor to Westinghouse Electric Corporation, East Pittsburgh, Pa., a corporation of Pennsylvania
Filed Apr. 24, 1958, Ser. No. 730,694
4 Claims. (Cl. 174—15)

This invention relates to gas insulated electrical apparatus and particularly to electrical apparatus embodying gaseous insulation having improved dielectric properties.

Recently, pure sufur hexafluoride has been proposed for use as a gaseous dielectric medium for sealed electrical apparatus, such, for example, as the so-called dry type transformer. The potentials that can be employed in electrical apparatus embodying pure sulfur hexafluoride as a dielectric medium is limited by the breakdown strength of the sulfur hexafluoride, particularly in non-uniform fields.

It is desirable to have available in the art a gaseous dielectric medium having superior dielectric properties to that of pure sulfur hexafluoride. Improvements in resistance to electrical breakdown and particularly to electrical breakdown in non-uniform fields, though slight, are highly desirable.

The object of this invention is to provide an enclosed electrical apparatus embodying a gaseous mixture of sulfur hexafluoride and trifluoromethylsulfur pentafluoride for electrical insulation, said gaseous mixture having a resistance to electrical breakdown which is superior to that of sulfur hexafluoride alone under comparable conditions.

Another object of this invention is to provide a method of insulating spaced electrical elements normally subject to differences of electric potential which comprises filling the spaces between said elements with a gaseous mixture of sulfur hexafluoride and trifluoromethylsulfur pentafluoride, thereby establishing a resistance to electrical breakdown which is superior to that of pure sulfur hexafluoride under comparable conditions.

Other objects of the invention will, in part, be obvious and will, in part, appear hereinafter. For a better understanding of the nature and objects of this invention, reference should be had to the following detailed description and drawing, in which.

Figure 1:
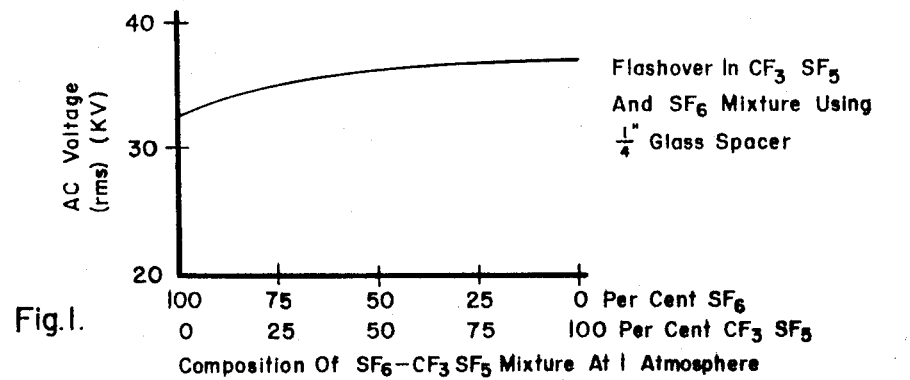
FIGURE 1 is a graph plotting flashover voltages of pure sulfur hexafluoride, pure trifluoromethylsulfur pentafluoride, and mixtures thereof.

In accordance with this invention, it has been discovered that improved gas insulated electrical apparatus may be made by employing therein gaseous mixtures comprising, by volume, from 10% to 65% of trifluoromethylsulfur pentafluoride and the balance, from 90% to 35%, of sulfur hexafluoride which mixtures provide gaseous dielectric media having superior breakdown strength to that of pure sulfur hexafluoride under comparable conditions. The superior breakdown strength of these gaseous mixtures is entirely unexpected. The flashover strength and the impulse strength of these gaseous mixtures are highly satisfactory. These gaseous compositions may be employed at atmospheric pressures as well as at pressures of several atmospheres.

Although a mixture of 10% trifluoromethylsulfur pentafluoride and 90% sulfur hexafluoride provides good improvement in breakdown strength over pure sulfur hexafluoride, it is preferred to use a mixture composed of at least 25% trifluoromethylsulfur pentafluoride and the balance being sulfur hexafluoride to obtain optimum dielectric properties.

Sulfur hexafluoride, $SF_6$, is a gas which liquefies at about $-64°$ C. at atmospheric pressure. It is commercially available. Methods of preparing sulfur hexafluoride are well known in the art.

Trifluoromethylsulfur pentafluoride, $CF_3SF_5$, is a gas that liquefies or condenses at about $-20.4°$ C. at atmospheric pressure. This gas and its method of preparation are described in U.S. Patent No. 2,697,726 to G. A. Silvey and G. H. Cady. The gaseous mixtures of this invention have relatively lower condensation or dew points than the pure trifluoromethylsulfur pentafluoride.

Breakdown measurements for the various sulfur hexafluoride-trifluoromethylsulfur pentafluoride mixtures were made in a three inch diameter cell of a volume of about one liter. The various compositions given in the several figures of the drawing are by volume and were determined by pressure measurements. For example, to prepare a 75% $CF_3SF_5$—25% $SF_6$, by volume, mixture, the cell was filled with $CF_3SF_5$ to 55 cm. Hg and $SF_6$ was added so that the final pressure of the gaseous mixture was about 73 cm. Hg.

Referring to FIG. 1 of the drawing, there is illustrated the flashover characteristics for several different $CF_3SF_5$-$SF_6$ compositions. The flashover voltages given are for a one-quarter inch stainless steel rod butted against the center of a one inch diameter, one-quarter inch thick glass disc placed on a two inch plane brass electrode. It is to be noted that the curve indicates a relatively rapid increase in flashover voltage and then it increases but slightly after the 50% mixture point has been reached. Thus, for improved flashover characteristics a composition comprising, by volume 50% sulfur hexafluoride and 50% trifluoromethylsulfur pentafluoride is practically as effective as an all $CF_3SF_5$ atmosphere.

Figure 2:
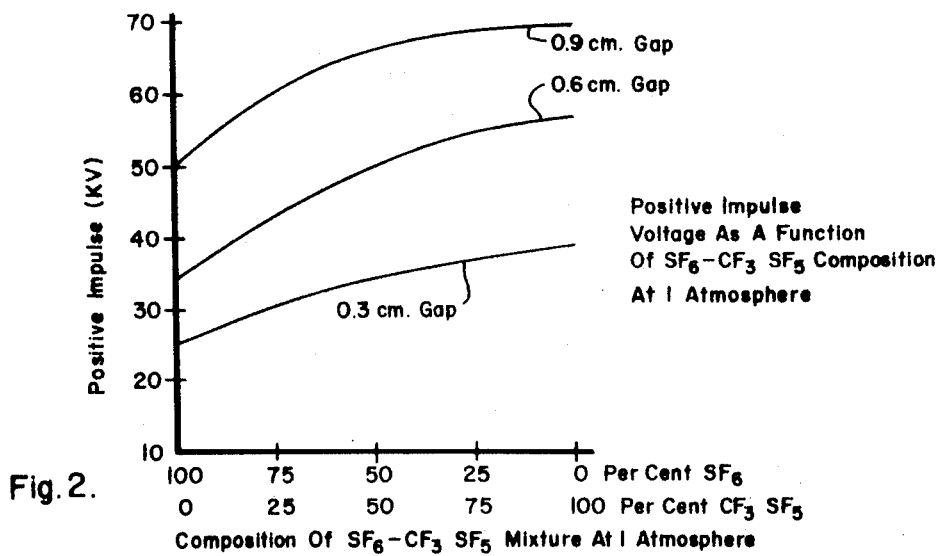
FIG. 2 is a graph plotting impulse dielectric strength of pure sulfur hexafluoride, pure trifluoromethylsulfur pentafluoride and mixtures thereof.

Referring to FIG. 2 of the drawing there is illustrated the positive impulse breakdown characteristics in a non-uniform field at different gaps for several $SF_6$-$CF_3SF_5$ compositions at a pressure of one atmosphere. The impulse voltages shown are for a one-sixteenth diameter stainless steel rod spaced from a one inch diameter brass disc. A gap of 0.9 cm. or greater between highest potential difference members will be present in most high voltage apparatus. It is to be noted that with increasing gap distances, a mixture comprising up to 50% sulfur hexafluoride and 50% trifluoromethylsulfur pentafluoride shows progressively greater improvement in impulse strength over pure sulfur hexafluoride, while beyond this point the benefits are only moderate. The curve at 0.9 cm. gap distance shows practically all of the improvement in positive impulse strength is attained by a 50-50 mixture of the gases. In considering the 0.6 cm. gap curve it will be noted that, while 50% $SF_6$—50% $CF_3SF_5$ mixture shows about a 50% improvement over pure $SF_6$ pure $CF_3SF_5$ shows only about a 70% improvement over pure $SF_6$.

Figure 3:
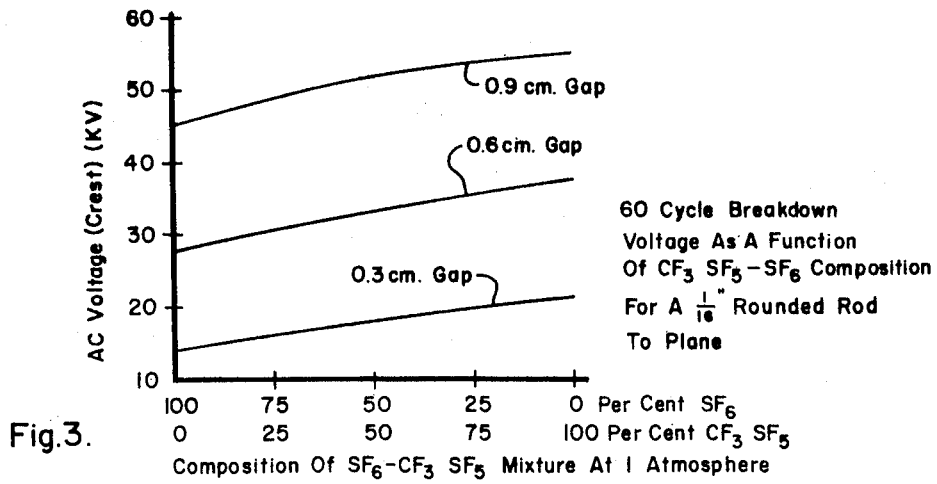
FIG. 3 is a graph plotting 60 cycle breakdown voltage for pure sulfur hexafluoride, pure trifluoromethylsulfur pentafluoride and mixtures thereof.

FIGURE 3 of the drawing shows the 60 cycle breakdown voltage for several gaps for different $SF_6$-$CF_3SF_5$ mixtures at atmospheric pressure in a non-uniform field. The alternating current voltages shown are for a one-sixteenth diameter stainless steel rod spaced from a one-inch diameter brass disc. While the curves shown for the 0.3 cm. gap and the 0.6 cm. gap are substantially straight line functions, it is to be noted that for the 0.9 cm. gap the curve rises rather rapidly until about a 50% $SF_6$—50% $CF_3SF_5$ mixture is reached, after which it rises only moderately.

Figure 4:
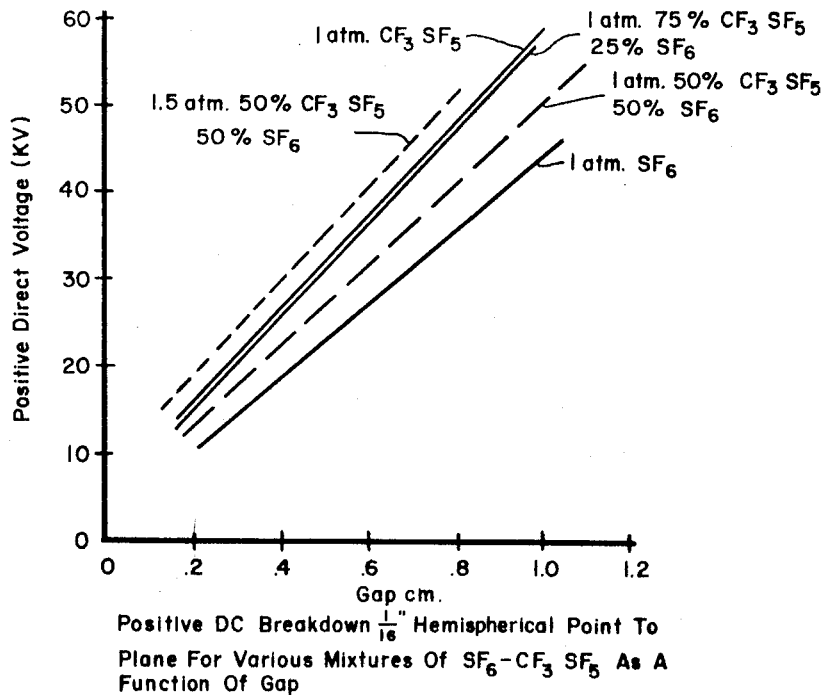
FIG. 4 is a graph plotting positive direct current breakdown voltage for pure sulfur hexafluoride, pure trifluoromethylsulfur pentafluoride, and mixtures thereof against several gap lengths.

FIG. 4 of the drawing shows positive direct current breakdown voltages as a function of gap for several $SF_6$-$CF_3SF_5$ mixtures. The voltages shown are for a one-sixteenth diameter stainless steel rod spaced from a one inch diameter brass disc. It will be noted that at a pressure of one atmosphere there is a substantial improvement in the breakdown strength of a 50% $SF_6$—50% $CF_3SF_5$ mixture over pure $SF_6$ while very little improvement is shown for pure $CF_3SF_5$ over a 75% $CF_3SF_5$—25% $SF_6$ mixture.

Figure 5:
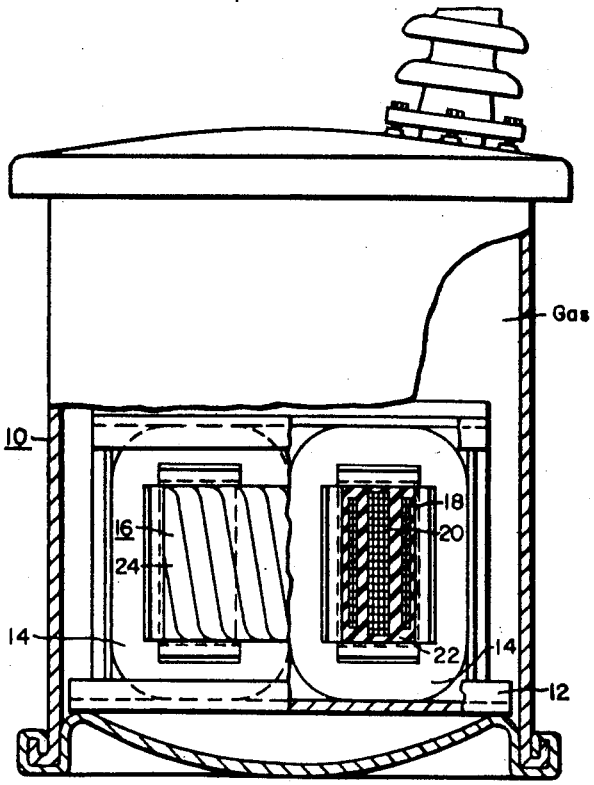
FIG. 5 is a view in elevation, partly broken, of a transformer embodying the composite gaseous insulation of the present invention.

In FIG. 5 of the drawing there is shown a transformer to which this invention is applicable. The transformer comprises a gas tight casing 10 carrying a support 12 internally on which magnetic core 14 and a coil 16 are disposed. The coil 16 comprises a high voltage winding 18 and a low voltage winding 20 insulated from one another by insulation 22. An exterior wrapping 24 of cloth or paper may be applied to the coil 16. The gaseous dielectric composition of this invention is charged into the gas tight casing to provide insulation between the casing and the several electrical components contained therein.

It is known that due to the inherent construction of this type of electrical apparatus, there are set up within the casing during operation various electrostatic fields, some of which may be substantially uniform but the major portion of which are essentially non-uniform as, for example, between the edges or ends of the low and high voltage coils. These electrostatic fields also exist between points of different shape and different potential which are spaced various distances apart. Particularly in high voltage equipment, these points which may be thought of as electrodes of different potentials are spaced at distances which are ordinarily at least one-quarter of an inch and generally in excess of one inch.

The gaseous mixtures of this invention are particularly concerned with this type of apparatus, that is, apparatus in which there are non-uniform field conditions and in which the gap or spacing between the electrodes defining the non-uniform field is relatively large.

Thus, it will be apparent to those skilled in the art that the mixtures of sulfur hexafluoride and trifluoromethylsulfur pentafluoride of this invention possess unexpected advantages as a gaseous insulating media for such apparatus. In particular, as shown in FIGS. 2 and 3 of the drawing, they show a highly desirable and unexpected departure from the usual characteristics of pure sulfur hexafluoride in non-uniform fields and particularly when the gaps are 0.9 cm.

It will be understood to those skilled in the art, that while the gaseous dielectric composition of this invention is of particular use in transformers such as the dry-type and the vapor cooled type, it may be employed in other forms of electrical apparatus contained in a sealed housing, such as capacitors, switchgear, reactors, cables and the like.

The gaseous compositions of this invention may be successfully employed under pressure, for example, under pressures up to about 5 atmospheres, if desired, with similar improvements in electrical insulating properties as obtained at one atmosphere.

It is to be further understood that the above description and drawing are illustrative only and not in a limitation of the invention.

I claim as my invention:

1. In an electrical apparatus, a sealed casing, a high voltage electrical device disposed in the casing, a potential being present between the high voltage electrical device and casing during use of the apparatus, and a gaseous insulating medium for electrically insulating the high voltage electrical device and the casing, said gaseous insulating medium comprising, by volume, from 75% to 35% of sulfur hexafluoride and from 25% to 65% of trifluoromethylsulfur pentafluoride, the trifluoromethylsulfur pentafluoride providing for a substantial increase in the dielectric strength of the sulfur hexafluoride.

2. In an electrical apparatus, a sealed casing, electrical conducting members in the casing charged at different potentials during use of the apparatus, and a gaseous insulating medium for electrically insulating the electrical conducting members, said gaseous insulating medium comprising a mixture of sulfur hexafluoride and trifluoromethylsulfur pentafluoride, the trifluoromethylsulfur pentafluoride being present in an amount of at least 25% by volume to provide for a substantial increase in the dielectric strength of the sulfur hexafluoride.

3. In an electrical apparatus, a sealed casing, electrical conducting members in the casing charged at different potentials during use of the apparatus, and a gaseous insulating medium for electrically insulating the electrical conducting members, said gaseous insulating medium comprising, by volume, from 75% to 35% of sulfur hexafluoride and from 25% to 65% of trifluoromethylsulfur pentafluoride, the trifluoromethylsulfur pentafluoride providing for a substantial increase in the dielectric strength of the sulfur hexafluoride.

4. In a transformer, a sealed casing, a magnetic core and an electrical winding disposed in the casing, and a gaseous insulating medium for the insulation of members charged at different potentials, said gaseous insulating medium comprising, by volume, from 75% to 35% of sulfur hexafluoride and from 25% to 65% of trifluoromethylsulfur pentafluoride, the trifluoromethylsulfur pentafluoride providing for a substantial increase in the dielectric strength of the sulfur hexafluoride.

References Cited in the file of this patent

UNITED STATES PATENTS

| | | |
|---|---|---|
| 2,221,670 | Cooper | Nov. 12, 1940 |
| 2,697,726 | Silvey et al. | Dec. 21, 1954 |
| 2,853,540 | Camilli | Sept. 23, 1958 |

FOREIGN PATENTS

| | | |
|---|---|---|
| 525,244 | Great Britain | Aug. 23, 1940 |
| 550,120 | Canada | Dec. 10, 1957 |
| 791,205 | Great Britain | Feb. 26, 1958 |

OTHER REFERENCES

Camilli: "Gaseous Insulation for High-Voltage Transformers," published in Transactions AIEE, vol. 71, Part 3. January 1952. Pages 348–349.